United States Patent
Goldhamer

(10) Patent No.: US 12,068,848 B2
(45) Date of Patent: Aug. 20, 2024

(54) ERROR METRICS FOR PHYSICAL LAYER FEC

(71) Applicant: Mariana Goldhamer, Ramat Gan (IL)

(72) Inventor: Mariana Goldhamer, Ramat Gan (IL)

(73) Assignee: Mariana Goldhamer, Ramat Gan (IL)

( * ) Notice: Subject to any disclaimer, the term of this patent is extended or adjusted under 35 U.S.C. 154(b) by 22 days.

(21) Appl. No.: 17/862,620

(22) Filed: Jul. 12, 2022

(65) Prior Publication Data
US 2023/0013165 A1    Jan. 19, 2023

Related U.S. Application Data

(60) Provisional application No. 63/221,030, filed on Jul. 13, 2021.

(51) Int. Cl.
*H04L 1/00* (2006.01)
*H04W 36/00* (2009.01)

(52) U.S. Cl.
CPC .......... *H04L 1/0041* (2013.01); *H04L 1/0063* (2013.01); *H04W 36/0072* (2013.01)

(58) Field of Classification Search
CPC ... H04L 1/0041; H04L 1/0045; H04L 1/0063; H04W 36/0072; H04W 52/16
See application file for complete search history.

(56) References Cited

U.S. PATENT DOCUMENTS

| | | | |
|---|---|---|---|
| 9,344,901 B2 | 5/2016 | Kanamarlapudi et al. | |
| 9,906,332 B2 * | 2/2018 | Rawat | H04L 1/1848 |
| 2008/0188258 A1 * | 8/2008 | Usuda | H04W 52/16 |
| | | | 455/522 |
| 2016/0135107 A1 * | 5/2016 | Hampel | H04L 12/4633 |
| | | | 370/238 |

OTHER PUBLICATIONS

3GPP TS 23.501 V17.0.0 (Mar. 2021) System architecture for the 5G System (5GS).
3GPP TS 38.212 V16.5.0 (Mar. 2021) NR, Multiplexing and channel coding.
3GPP TS 38.413 V16.5.0 (Apr. 2021) NG-RAN; NG Application Protocol (NGAP).
3GPP TS 38.300 V16.5.0 (Mar. 2021) NR; NR and NG-RAN Overall Description; Stage 2.
3GPP TS 36.300 V16.5.0 (Mar. 2021) E-UTRA; E-UTRAN Overall Description; Stage 2.

* cited by examiner

*Primary Examiner* — Shelly A Chase

(57) ABSTRACT

A radio communication link is established between first and second nodes in a cellular network, which comprise at least channel coding and decoding of first and second Physical (PHY) layers and first and second Medium Access Control (MAC) sublayers.

User data is transmitted from the first node to the second node while applying a PHY Forward Error Correction (FEC) algorithm in transmission for coding and in reception for decoding by the first and second PHY layers.

A value of a PHY-FEC error metric is computed with respect to errors in the user data received by the second node that are uncorrected by the PHY FEC algorithm.

The received user data including the uncorrected errors is transferred from the second PHY layer to the second MAC sublayer, subject to the value of the PHY-FEC error metric being less than a threshold used by an error tolerance procedure.

24 Claims, 6 Drawing Sheets

FIG. 1 – PRIOR ART

ERROR METRICS FOR PHYSICAL LAYER FEC

CROSS-REFERENCE TO RELATED APPLICATION

This application claims the benefit of U.S. Provisional Patent Application 63/221,030 filed on Jul. 13, 2021 which is incorporated herein by reference.

FIELD OF THE INVENTION

The invention relates generally to digital communication systems and in particular to the error tolerance support by wireless systems.

The list of abbreviations used in this document is provided at the end of this specification.

BACKGROUND OF THE INVENTION

Video conferencing, multi-player gaming, multi-person augmented and virtual reality and Internet of Things applications may use AL (Application Layer) Forward Error Correction (FEC) codes for improving the receiver reliability.

Some applications are error-tolerant by accepting a small number of errors.

While the 5G System (5GS) has in general dramatically improved QoS (Quality of Service) support, sometimes introduces significant errors by dropping packets at PHY (Physical Layer) level even for small errors, not accounting for the AL-FEC or for some error tolerance at Application Layer.

The user packet dropping by the cellular system may negatively affect the deterministic operation required in automation.

SUMMARY OF THE INVENTION

The disclosure may be summarized by referring to the appended claims.

The invention provides a solution for improved latency and reliability, based on interaction between the AL-FEC and the FEC used in cellular system. In this way, the cellular system relies on AL-FEC for reliability, becomes error-tolerant, and eliminates the temporal jitter introduced by ARQ (Automatic Retransmission Request) and HARQ (Hybrid ARQ), which may be a problem in ultra-fast deterministic systems.

BRIEF DESCRIPTION OF THE DRAWINGS

For a more complete understanding of the present invention, reference is now made to the following detailed description taken in conjunction with the accompanying drawings.

The drawings do not represent an exhaustive representation of the possible embodiments of the invention and the invention is not limited to the arrangements presented in the drawings.

The Drawings are.

DETAILED DESCRIPTION

Figure 1:
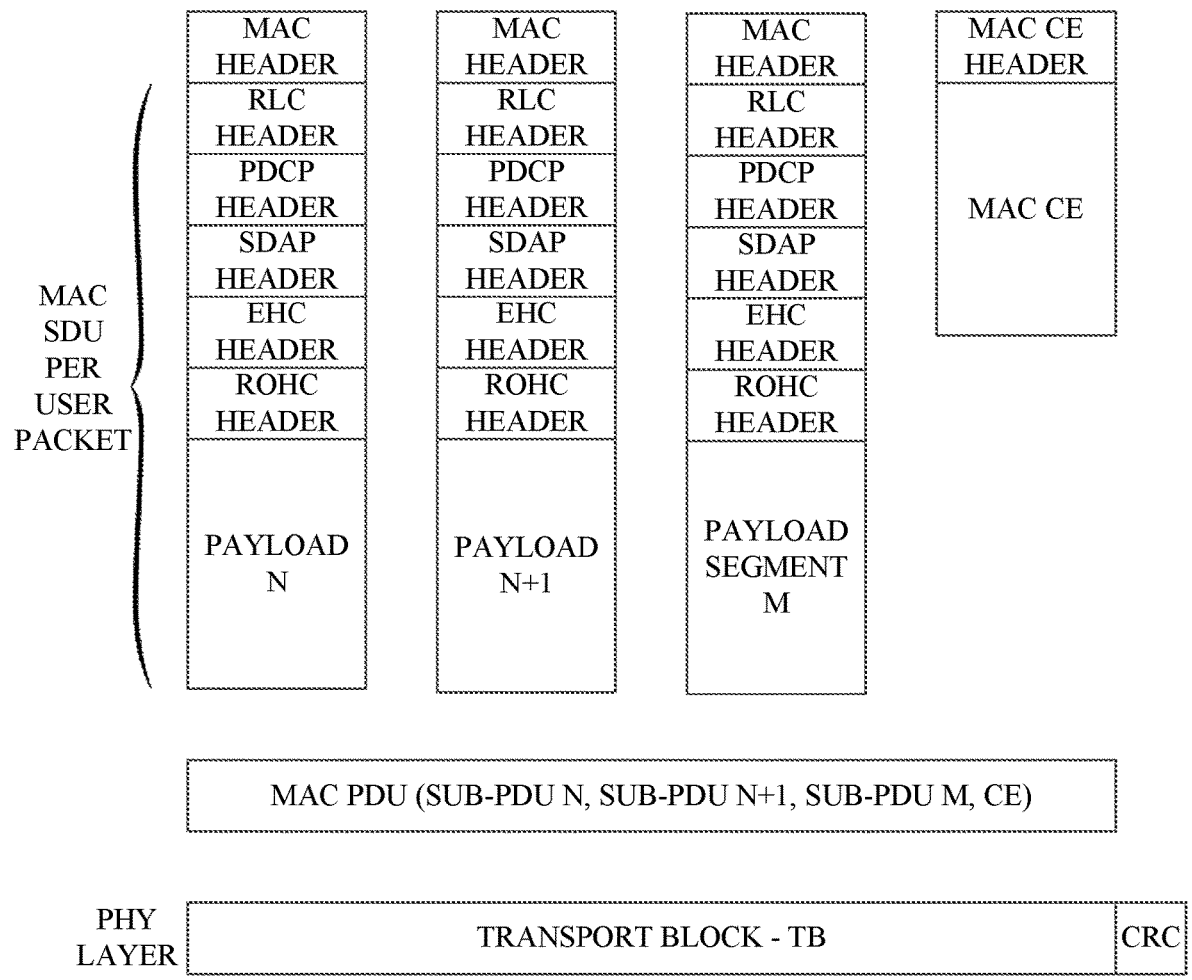
FIG. 1—Represents a MAC (Medium Access Control) PDU (Packet Data Unit)—Prior Art.

In the following description, for the purposes of explanation, numerous specific details are set forth for providing a better understanding of the present invention by way of examples. It should be apparent, however, that the present invention may be practiced without these specific details.

The following description uses terminology familiar to those skilled in the art of wireless cellular networks and skilled in NR (New Radio)/5G technology. However, this fact should not be considered as restricting the applicability of the invention to these technologies, and the present invention also encompasses other similar technologies as well as evolving cellular technologies.

It is understood, for all the embodiments, that UE (User Equipment) has previously executed the procedures for connection to the cellular network or, in sidelink communication, to another UE and is allowed at least to receive information over the air from the radio network or from the other UE.

Application Layer (AL) Forward Error Correction (FEC)

The application layer may use FEC, for example in cases when the latency requirements do not allow application layer retransmissions.

The limitation of retransmissions at application layer is related to latency constraints and typically happens in video conference applications, in V2X (Vehicle to Everything) sensor sharing and in deterministic industrial applications, required to deliver reliable and time-predictable services.

Dropping data packets by the cellular system is sometimes counterproductive as long as AL-FEC is implemented.

Below are few examples of reasons for packed dropping:
a. Congestion at transport network level; repairing these types of errors is possible, but not feasible in Packed Delay Budget-limited applications and Survival Time-limited applications due to the delays introduced by the process of frame data spread on other frames;
b. Errors in wireless and cable medium, which cause the PHY (Physical) layer to drop the packets on receiver side. In video transmission, dropping packets aggregating image information cause more artifacts as compared with transmitting packets having only a very small number of bit-level errors and which can be repaired by the AL-FEC.

A criterion for selecting an AL-FEC algorithm and/or an AL-FEC coding rate could be the type of service provided by the Operator for a specific subscription type.

In this invention is changed the behavior of the cellular system, such to allow some errors (Error Tolerance concept) and to deliver errored user data to applications, in cases that the application is by itself tolerant to errors or implements AL-FEC.

In this invention is introduced the PHY (Physical Layer)—FEC metric and its threshold for selecting user packets to be delivered to the user even if they contain errors in the payload.

In an embodiment of this invention an Application Function (AF) may define different flows with associated PDU sessions and QoS requirements for each object or for specific groups of objects or for specific content or for specific quality control level.

In addition, AL-FEC may have parameters (for example and identifier of the FEC algorithm and/or a coding rate) specific to an object or group of objects or a given content or a quality control level.

In this way an object of interest, for example in a video image, may benefit of a specific QoS level and PHY-FEC parameters and thresholds.

The application layer or a wireless standard or a management system may request the cellular system to implement different behaviors which can be dynamically configured or pre-configured, for example based on standardized algorithms or parameters:

A. Accept packets with errors and deliver them to the Application Layer of the user or of the Application Server.
B. Accept packets with errors under a first threshold of a PHY-FEC Error Metric or alternatively accept packets with errors as long as the PER (Packet Error Rate) is under a second threshold and deliver them to the user.
C. Accept packets with errors and deliver them to the AL-FEC correction layer.
D. Accept packets with errors under a first threshold of a cellular PHY-FEC Error Metric or alternatively accept packets with errors as long as the PER is under a second threshold and deliver them to the AL-FEC correction layer.

The first Error Metric, as further defined in this invention, is the number or the rate of failed parity check equations at the PHY-layer FEC, for example LDPC (Low Density Parity Codes) in 5G or Turbo Codes in LTE.

In cases A or C, the quality of the video perceived by an AI/ML (Artificial Intelligence/Machine Learning) algorithm can be used by the application for requesting the cellular system either to disable this behavior (i.e. to drop the errored packets) or to increase the PHY-FEC code rate or to reduce the Packet Error Rate (PER) under a second threshold.

In cases B or D, the quality of the video perceived by an AI/ML algorithm can be used by the application for requesting the cellular system either to disable this behavior (i.e. drop the errored packets) or to modify the first threshold of the PHY-FEC Error Metric or the second threshold for PER.

Alternatively, the Application (i.e. the Application Function) can indicate to the CN (Core Network) its AL-FEC error correction algorithm and/or its code rate (the number of payload bits divided by the sum of the number of payload bits and redundant bits) and/or the AL-FEC actual performance and let the cellular system to determine the PHY-FEC Error Metric and the suitable threshold for it, such to improve the performance of the combined PHY-FEC and AL-FEC algorithms.

The introduction of the PHY Error Tolerance concept for User Plane involves a special behavior of the cellular system, which currently discards, at the PHY Layer, the received TBs (Transport Block), containing user data and having at least one errored bit.

Relation between QoS (Quality of Service) and PHY Error Tolerance (PET)

The cellular Core System or the UE attaches a characterization of QoS requirements to a PDU (Protocol Data Unit) session connecting a UE to the data network and transmitting an application data flow.

The QoS requirements or limitations are identified by a QoS Flow Identifier (QFI). Some QFIs are predefined, being named 5QI (5G QoS Identifier), and new QFIs can be defined for new requirements.

The 5QI requirements use threshold values for relevant parameters; the system will try to respect the constraints introduced by the thresholds of 5QI parameters, which cover currently Priority level, Packet Delay Budget, Packet Error Rate and few other (see TS 23.501 v17.0.0, Section 5.7.3).

In embodiments of this invention are defined Error Metrics specific to the PHY Error Tolerance for user data, which are based on Error Metrics relative to Forward Error Correction algorithms used in the PHY Layer of the cellular system.

In an embodiment of this invention, the QFI (QoS Flow Identifier) to be defined in CN or at UE includes a threshold for each PHY-FEC Error Metric.

The Residual Error PHY-FEC metrics defined here are errors detected after applying the PHY-FEC algorithms for the predefined number of iterations or until performance saturation.

In an embodiment of this invention is defined a Error Metric related to PHY Forward Error Correction operation defined as the Residual Number of Failed Equations (RNFE) in LDPC parity checks for one or all code segments included in a TB (Transport Block), carrying a user packet or a part of it.

In another embodiment is defined another Error Metric, namely the Residual Failed Equations Rate (RFER) in the LDPC parity checks for one or all code segments included in a TB, where the RFER is defined as RNFE divided by the total number of Parity Check Equations within the TB.

The transmitting MAC sublayer instructs the receiving PHY layer through a DCI (Downlink Control Information) message or a DCI information field which Error Metric shall be reported to the higher layers of the receiver or of the transmitter.

Alternatively, the UE is configured by an RRC message regarding the Error Metric(s) selected to be reported to the higher layers of the receiver or of the transmitter.

In another embodiment, the new PHY-FEC Error Metrics RNFE and RFER are introduced as new QoS and/or 5QI parameters.

The thresholds of Residual Failed Equations Rate and/or Residual Number of Failed Equations can be configured or pre-configured within the Core Network or within the RAN for a given application, either for both uplink and downlink or separately for uplink or downlink.

PHY Layer Behavior

Channel coding is needed in wireless systems for providing reliability for data and control information transmission over the air, experiencing fading and interference.

User traffic in uplink (UL), i.e. from the UE towards the Network, in downlink (DL) i.e. from the Network towards the UE, on sidelink (SL), i.e. between UEs without passing through the base station, and broadcast traffic are encoded in 5G/NR, before the transmission over the air, with Low Density Parity Check (LDPC) codes and in LTE with Turbo codes.

The PHY Layer channel coding has the following functionality:

a. Cyclic Redundancy Check (CRC) attachment to the TB received from the MAC sublayer, which enables detection of errors at the receiver;
b. FEC (LDPC in 5G/NR) encoding using the procedures detailed in 3GPP TS 38.212
c. Rate matching to fit for the available downlink, uplink or sidelink resources
d. Code block concatenation.

At the end of the channel coding procedures, are provided the user useful bits and the parity check bits.

The number of parity check equations in a TB, identified by a specific LCID (Logical Channel Identifier) in the MAC header, results at both transmitter and receiver by applying the LDPC base graph as described in 3GPP TS 38.212, for the code rate provided in the DCI or SCI (Sidelink Control Information) messages for TB scheduling, transmitted on PDCCH (Physical Downlink Control Channel) or PSCCH (Physical Sidelink Control Channel) with different formats for downlink, uplink, and respectively sidelink, where the code rate results from the MCS (Modulation and Coding Scheme) row in the MCS suitable table.

The TB_FEC_Total_Equations variable is set to be equal with the number of parity check equations for the TB, known at both transmitting and receiving side.

In case of code segmentation, the TB_FEC_Total_Equations contains the sum of the number of equations in the entire TB.

The Cumulative_FEC_Total_Equations (a PHY-FEC Error Metric) for a specific LCID is determined for a number of TBs transmitted in a time interval configured by the higher layers or between start and stop signals, by summing the values of TB_FEC_Total_Equations in the relevant time interval.

The LCID is allocated per UE and per Radio Data Bearer, which can be made specific for a PDU Session (UE communication with a given Application) flow and QFI and also specific to a selected PHY-FEC Error Metric.

The location of the data bits connected to variable nodes in LDPC Tanner graph representation, and selected to be used in each parity check equation, result from the procedures defined by 3GPP TS 38.212 which are implemented at transmitter and at receiver.

In an embodiment of this invention, when in the final iteration to be executed by the channel decoder the result of a parity check equation is different from its parity check bit (connected to the check node in Tanner graph), the equation will be counted as residual failed equation and the TB_FEC_Residual_Failed_Equations variable, initially set to zero for each TB, will be incremented for each failed equation in the final iteration, for obtaining the value of the QoS parameter/Error Metric named above "Residual Number of Failed Equations", a PHY-FEC Error Metric.

The TB_FEC_Residual_Failed_Equations_Rate per TB, representing the value of the QoS parameter "Residual Failed Equations Rate", being also a PHY-FEC Error Metric, can be calculated by dividing the TB_FEC_Residual_Failed_Equations with the TB_FEC_Total_Equations.

The Cumulative Residual Failed Equations Rate, also PHY-FEC Error Metric for a specific LCID, is determined for a number of TBs transmitted in a time interval configured by the higher layers or between start and stop signals, by summing the values of TB_FEC_Residual_Failed_Equations in the relevant time interval and dividing the sum with the Cumulative_FEC_TB_Total_Equations determined for the same LCID and time interval.

TB_FEC_Residual_Failed_Equations and TB_FEC_Residual_Failed_Equations_Rate can be reported per TB and the Cumulative Residual Failed Equations Rate can be reported by the PHY layer per the relevant time interval to the higher layers located in base station or in UE or in another sidelink UE in one of the appropriate modes:

A. Reported to BS transmitter by the UE, while using a message to base station over PUCCH (Physical Uplink Control Channel) or by the PUSCH or to another UE over PSFCH (Physical Sidelink Feedback Channel) or by using RRC messages for a receiver UE, as appropriate.

B. Reported to the higher layers of the receiver; if these layers are situated in a base station, may be used the 3GPP F1 interface between the Central Unit and the Distributed Unit, while if these layers are in the Core Network, in addition can be used the NR Interface named also N2 reference point between gNB (5G Node B) and AMF (Access Management Function).

The CRC is attached by the Physical Layer (PHY) to the Transport Block (TB) provided by the MAC sublayer at transmitter and is used at receiver for checking whether the received TB is error free.

In the prior art, a confirmed CRC is reported by the PHY layer to the MAC sublayer of the receiver which sends an ACK (Acknowledge) message on the PUCCH or PUSCH or PSFCH, while a failed CRC check will cause the MAC sublayer to send a NACK (Not ACKnowledged) over the PUCCH or PUSCH or PSCFCH and ask the PHY layer to discard the TB.

In this invention, when PHY Error Tolerance procedure is activated for the LCD used in the MAC header or for user data sent into a scheduling assignment or scheduling grant dedicated to Error Tolerance procedure, there are two possibilities:

A. The receiving PHY layer reports to the receiving MAC sublayer the values of the PHY-FEC Error Metrics and the MAC sublayer compares the values with the corresponding thresholds; if the values of the Error Metrics are higher than the corresponding thresholds, the TB is discarded by the PHY at MAC sublayer request; otherwise, the received TB is transferred to the MAC sublayer.

B. The receiving PHY layer is configured with the value of the thresholds of the PHY-FEC Error Metrics; the receiving PHY layer compares the values of the PHY-FEC Error Metrics with the corresponding thresholds and reports to the receiving MAC the result of the comparison; if the values of the Error Metrics are higher than the corresponding thresholds, the TB is discarded by the PHY; otherwise, the received TB is transferred to the MAC sublayer.

In an embodiment, in case that the value of PHY-FEC Error Metric is under its threshold, the UE sends an ACK over the PUCCH or over PUSCH or over the PSFCH in sidelink communication.

In other embodiments, when it is desired that the transmitting entity will be informed that the TB was received with errors under the threshold of the PHY Error Metric, a "Partial ACK" may be transmitted back from the receiver to transmitter while using either a message or field in a message over PDCCH or using a message or a field in a message transmitted over the PUCCH or PUSCH, or using a message or field in a message transmitted over the PSFCH in sidelink communication. The message can be a CE, a field in UCI or in DCI.

In cases where is desired that the RAN receiving layers above PHY, from MAC sublayer, going through RLC (Radio Link Control), PDCP (Packet Data Convergence Protocol) and SDAP (Service Data Adaptation Protocol) sublayers will be aware that the forwarded received PDU contains PHY-level errors, the PHY layer will inform the MAC sublayer regarding the existence of errors below the threshold of the PHY-FEC Error Metric and eventually will indicate also the values of the PHY-FEC specific Error Metrics or the content of the "Partial-ACK" information.

In an embodiment, the reports can be included within a MAC header or through a Control Element within the TB.

Another possibility is that the errored TBs will be sent on an LCID (Logica Channel ID) reserved for MAC PDUs or sub-PDUs with errors.

The transmission of user data with errors can be further mapped to a specially allocated DRB (Data Radio Bearer).

In an embodiment, the MAC sublayer at receiver will alter the SDAP header, by introducing a QFI value or a special bit which will indicate that in the corresponding PDU there are errors detected at PHY-FEC level.

This QFI value shall be part of the 5QI list (the predefined QFI values).

SDAP sub-headers may include the measured values of the PHY-FEC specific Error Metrics.

MAC PDU Formation

The MAC sublayer provides the PHY layer with the MAC PDU, named also Transport Block (TB), including MAC sub-PDUs containing user data, and eventually MAC sub-PDUs containing Control Elements.

Each MAC PDU or MAC sub-PDU contains a MAC SDU and a header, respectively a sub-header, as shown in FIG. 1—Prior Art. In fact, in transmission chain, each sublayer ads a header to the SDU received from the previous layer.

Each MAC header or sub-header contains at least an LCID (Logical Channel ID) and the length L of the MAC SDU/sub-SDU, or of the variable size MAC CE (Control Element) in bytes, such that is possible to calculate the length of the TB transmitted to the PHY layer.

The TB comprise one or more user data packets and headers added to each packet or segment of a packet by the upper layers.

Each TB may be retransmitted as a whole or in code segments.

Depending of configurations, QoS requirements and eventually slice parameters, HARQ (Hybrid Automatic Repeat Request) process may be used by the MAC sublayer for retransmission and soft combining of information at the receiver PHY layer.

Alternatively, multiple TB retransmissions are performed with the hope that the receiver will be able to decode at least one of them correctly.

In an embodiment of this invention, in case that AL-FEC is applied, an errored TB can be sent to the upper layers without trying to correct it by HARQ retransmissions. In an embodiment, the HARQ retransmissions may stopped when the value of the PHY-FEC Error Metric drops under the threshold.

MAC Behavior for Reliable Delivery of Headers

Given that the headers added by the Layer 2 sublayers SDAP, PDCP, RLC and MAC sublayers contain information which shall be error-free for the correct operation of the cellular system, and also the user data may contain important information in their transport IP or Ethernet or unstructured headers, the Transport Block aka MAC PDU structure shall be modified, based on an embodiment of this invention, such to allow errors only in user payload and to not allow errors in cellular added headers and in transport added headers.

Figure 2:
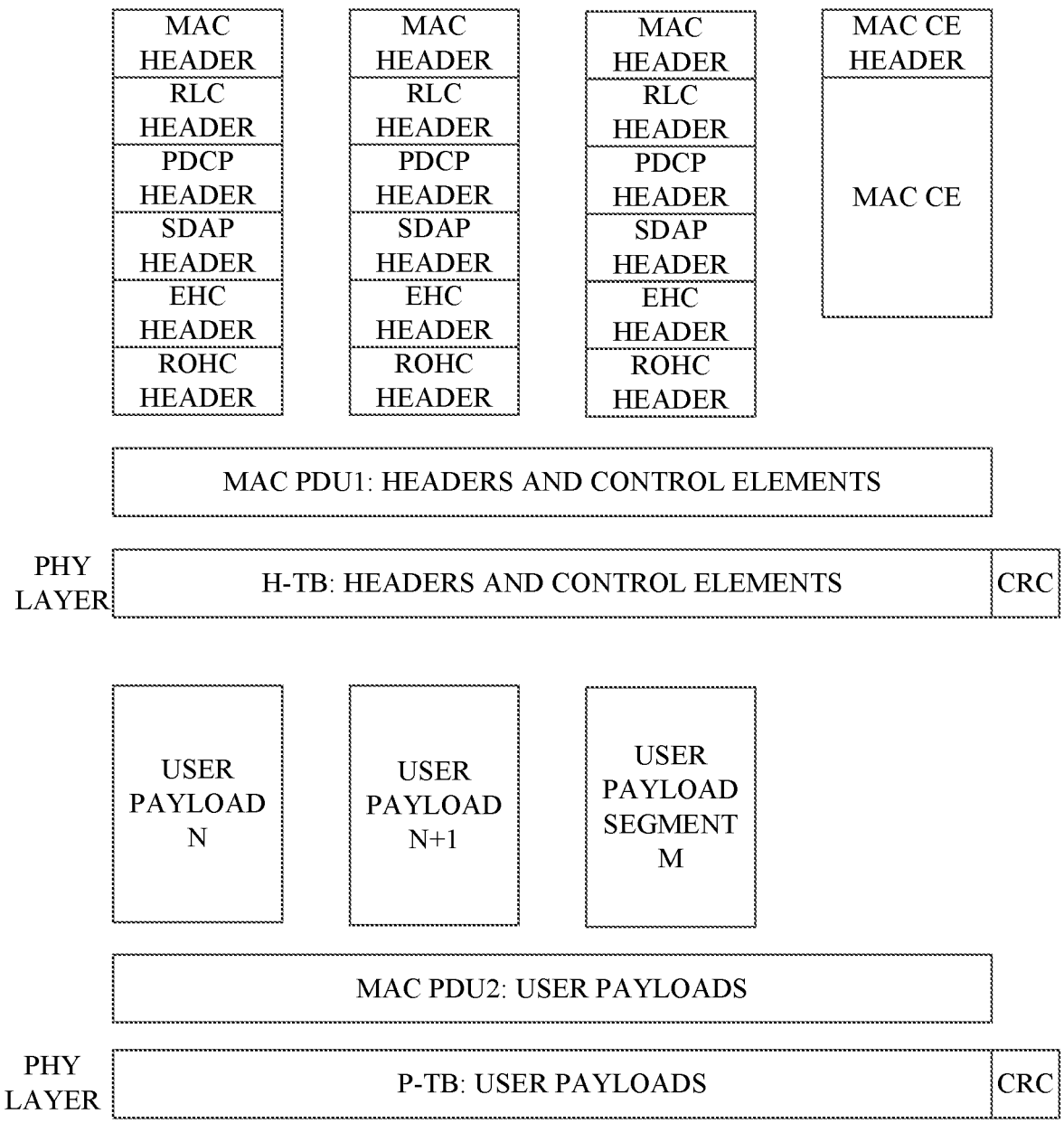
FIG. 2—Represents headers and payload separation in different MAC PDUs.

A first approach is that the appended cellular headers and sub-headers and eventually MAC CEs and user IP or Ethernet headers shall be included in a first H-TB (Headers TB), while the user data shall be included in a payload-dedicated second P-TB (Payload TB), as shown in FIG. 2.

In this figure is assumed that there are both Ethernet and IP headers in the user packet, each compressed by respectively EOC (Ethernet Header Compression) and ROHC (Robust Header Compression) algorithms.

It should be noted that most of the content of the transport headers is identified as stable context by the ROHC procedure or by the EHC procedure in PDCP, and transmitted to receiver prior to user payload transmission, in an RRC message containing the ROHC/EHC Context and the Context ID (CID).

In a second approach, within the P-TB are incorporated the headers of the user packet, and in the H-TB are included only the cellular added headers and eventually MAC Control Elements.

When the original packet length value and the Context ID have a very short length relative to the payload length, the probability that ROHC/EHC Context and the Context ID will be affected by errors is a very low.

On the receiving side, in both first and second approaches, errors will not be accepted within the H-TB, and in case of failure of its CRC check the P-TB carrying the payload of user data will be discarded.

Figure 3:
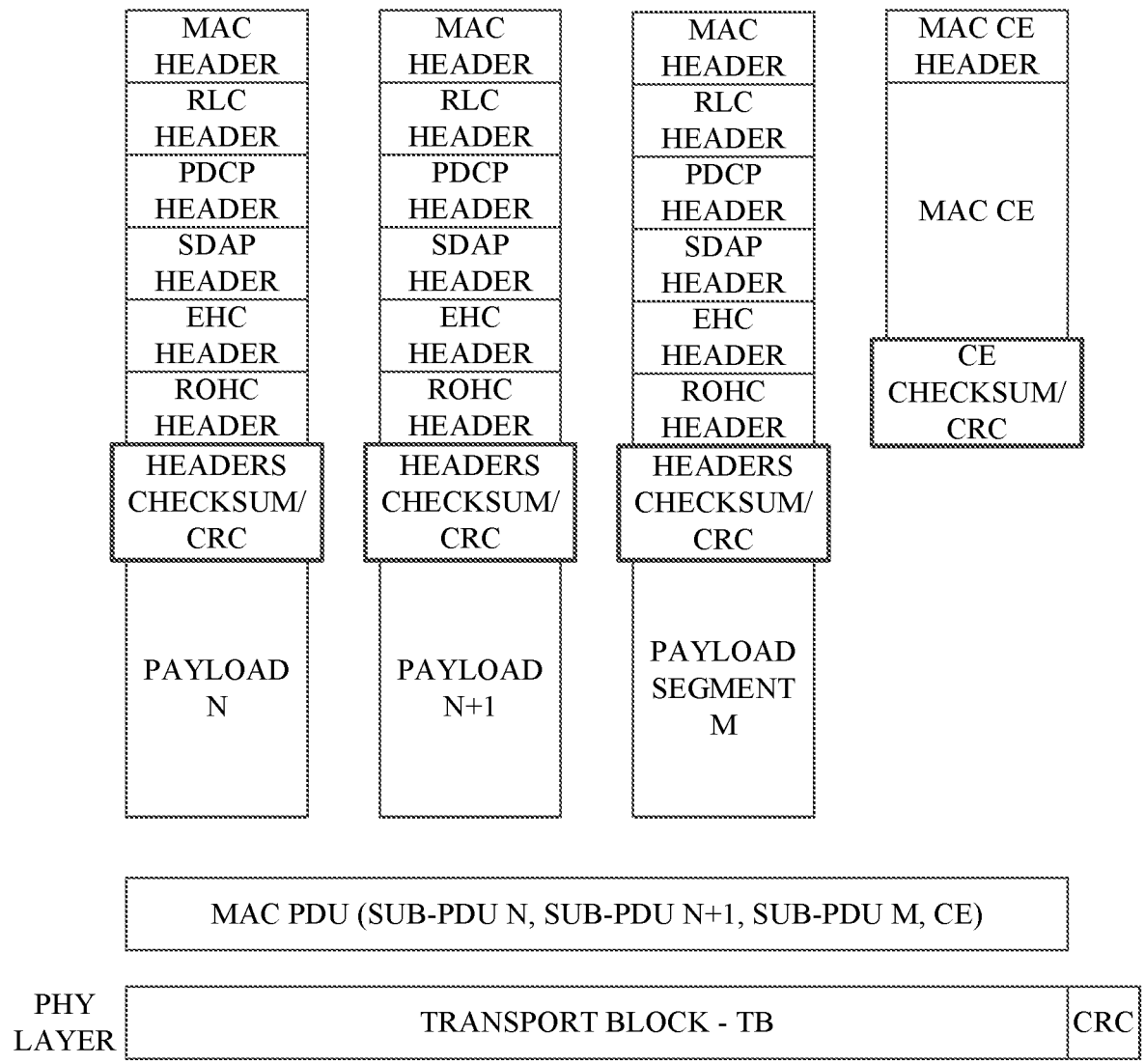
FIG. 3—Represents a MAC PDU, with an added checksum or CRC (Cyclic Redundancy Check) for the headers.

In a third approach the MAC PDU is transmitted in a single TB, but the structure of the MAC PDU is modified as shown in FIG. 3.

In this approach, one or more cellular added headers and the IP or Ethernet original or compressed ROHC/EHC headers are grouped together and are protected at the MAC sublayer of the transmitter by a checksum or by a CRC calculated for the grouped headers.

If the PHY receiver detects errors in the TB, either the PHY layer or the receiver MAC sublayer recalculate the checksum/CRC of the grouped headers; in case that the result is not consistent with the checksum/CRC appended at transmitter, the entire TB is discarded; otherwise, the number or the rate of the FEC failed equations will be checked against the respective thresholds and the decision whether to keep the TB will be taken as explained before.

The fourth approach is similar with the third approach, with the exception that only the cellular added headers and eventually the MAC Control Elements will be protected by an added checksum or CRC.

In the fifth approach the headers will not protected.

Scheduling of the MAC PDU

One or more FEC Error RNTIs used to scramble the CRC of the DCI sent on PDCCH will indicate to the PHY layer that the scheduled MAC PDU is subject to the PHY Error Tolerance procedure.

In an embodiment of this invention, a specific UE is configured with one or more PET-RNTIs (PHY Error Tolerance-RNTI) to be used for transmitting user data or control information related to PHY Error Tolerance procedure, to a specific remote UE or to a remote specific group of UEs.

The PET-RNTI is used for scrambling the CRC of DCI (Downlink Control Information) or of the SCI (Sidelink Control Information) pertinent to the PHY Error Tolerance procedure.

The H-TB and P-TB may be scheduled while using for each one a corresponding H-RNTI and P-RNTI for scrambling the CRC appended to the DCI or SCI scheduling message transmitted on the PDCCH or respectively on the PSCCH.

The receiver may be instructed to use relevant information, for example MCS or code rate or both, within the TB scheduled with the H-RNTI, after its successful decoding at receiver, for the PHY processing of the TB scheduled with P-RNTI.

The values of the pair LCIDs used in H-TB header and in P-TB header of a user packet in a flow which is subject to PHY Error Tolerance procedure can be configured through new RRC messages or indicated by a new DCI or UCI or SCI message or information field.

The above configurations can also specify the selected approach for TB transmission, detailed above, wherein each approach will be numerically identified.

Another possibility is to introduce in the MAC header an indication that the TB includes headers only or payload only.

Support for Error Tolerance at MAC and PHY Layers

In an embodiment of this invention, the scheduling rules to be applied by the MAC sublayer for a specific QoS flow and/or PDU session using the PHY Error Tolerance behavior are configured by the higher layers.

The DCI is used by the base station for signaling to the UE, between other items, the downlink scheduling assignment or the uplink scheduling grant and their parameters for data transmission to a UE or respectively from a UE.

The MAC sublayer of the base station, based on an embodiment of this invention, informs the UE through the DCI, whether the downlink assignment or the uplink grant are intended for user packets which may be forwarded by the receiving PHY to the receiving MAC while having residual errors lower than a threshold for an PHY-FEC Error Metric.

In an embodiment of this invention, the DCI indicates whether the scheduling grant shall be used by the remote UE for sending an uplink TB including uplink user data to be delivered by the remote BS (Base Station) PHY layer to the remote BS MAC sublayer in case that the PHY-FEC Error Metric is under a threshold.

In another embodiment is used within the DCI message or in its header, indicating the downlink scheduling assignment or the uplink scheduling grant, an indication (one or more bits or a specific LCD) that the TB to be scheduled within the specified resources contains one or more user packets, subject to the Error Tolerance procedure, which may be forwarded by the receiving PHY to the receiving MAC while having residual errors lower than a threshold of a PHY-FEC Error Metric.

In an embodiment is used within the SCI message or in its header, an indication (one or more bits or a specific LCID) that the TB to be scheduled within the specified resources contains one or more user packets which may be forwarded by the receiving PHY to the receiving MAC while having residual errors lower than a threshold of a PHY-FEC Error Metric.

A MAC Control Element can be used for activating or disabling the allowance of errors within user payload and/or for configuring or re-configuring the threshold(s) of the PHY-FEC Error Metric (s) for a specific LCD.

Such a Control Element will be sent while using a special LCD and will contain the LCD used for transmitting user traffic or user-specific headers, as described before.

The same message can be transmitted by RRC, while using an LCD allocated for the specific user traffic subject to PHY Error Tolerance behavior or a DRB (Data Radio Bearer) Identifier allocated for transmitting the traffic of the specific UE PDU session subject to PHY Error Tolerance behavior.

In another approach is defined a new RNTI which indicates that the scheduling assignment or grant is for transmitting user packets which may be forwarded by the receiving PHY to the receiving MAC while having residual errors lower than a threshold of a PHY-FEC Error Metric.

RRC Configurations

RRC messages can be used for determining whether a specific UE supports the Error Tolerance procedures.

In some cases, like persistent or semi-persistent scheduling. the downlink scheduling assignment and/or the uplink scheduling grant can be configured through the RRC protocol.

In an embodiment of this invention the RRC semi-persistent scheduling message, sent by a BS or another UE in sidelink communication, indicates whether the scheduling assignment or the uplink grant is used for sending a downlink or respectively uplink TB including user data to be delivered by the receiving/remote PHY layer to the receiving/remote MAC sublayer according to the Error Tolerance procedure, i.e. in case that the PHY-FEC Error Metric is under and/or equal to a threshold.

In another embodiment of this invention, it is used the RRC protocol for configuring the value of the threshold(s) of the PHY-FEC Error Metric(s) of the remote UE.

The Error Metric to be used by the PHY of the remote UE and/or the threshold of the PHY-FEC Error Metric can be specific to a PDU session and/or to a QFI and can be transmitted to the remote UE as part of the PDU session resource establishment or modification messages.

High Layer Interfaces

In case that the BS is functionally split into a CU and a DU, in an embodiment of this invention the CU will transmit to the DU serving a specific UE the configuration/reconfiguration pertinent to a PDU session, including the Error Metric to be used by the PHY of the DU and/or the threshold of the PHY-FEC Error Metric.

In addition, the content of the RRC messages between the UE and gNB-CU is transmitted over the gNB-CU to/from gNB-DU interface, named currently F 1 in 5G/NR architecture.

The communication between Base Station and the Session Management Function (SMF) in the Core System, for transmitting the thresholds of the PHY-FEC Error Metric or the selected policy of the PHY Error Tolerance behavior and PHY Error Tolerance reports, will take place over the Logical Interface/Reference Point NR/N2 between the Base Station and the Access Management Function (AMF) and in continuation over the Reference Point N11 between AMF and SMF.

The communication between User Equipment and the Session Management Function (SMF) in the Core System, for receiving the thresholds of the PHY-FEC Error Metric or the selected policy of the PHY Error Tolerance behavior and PHY Error Tolerance reports, takes place over several segments:

A. N11 Reference Point, between SMF and AMF, which relays the information to/from N1 Reference Point;

B. N1 reference point, between UE and AMF, which contains information transmitted over RRC protocol between UE and base station and over NR interface, currently defined in 3GPP TS 38.413, between the base station and AMF.

It is clarified here that in fact N1/N2 Reference Points, defined for the Core System, contain messages or Information Elements which are transmitted over the NR Interface, currently defined for 5G/NR Radio Access Network in 3GPP TS 38.413.

Optimizations

In an embodiment of this invention, a control entity or function or application can be used for optimizing the PHY-FEC Error Metric and/or its threshold, to be named here Central Controller and Coordinator (CCord).

A CCord can be the near-real time RIC (RAN Intelligent Controller) having the O-RAN Forum standardized interface E2 for the communication between RIC and CU and/or for the communication between RIC and a DU of the base station.

A CCord can be also the Base Station Controller, located or not within Central Unit in case of CU-DU split, and controlling through F1 interface the MAC/PHY operation in gNB-DU or controlling through RRC protocol the UE operation.

A CCord can be also placed in the Core Network, an example the Network Data Analytics Function (NWDAF).

In one embodiment, the PHY transmitter, in case that the actual values of the PHY-FEC Error Metric exceed the threshold defined for each PHY Error parameter, can be instructed by higher layers to reduce the code rate to a new value or to increase the number of iterations of the PHY-FEC algorithm to a new number.

In another embodiment, in case that the AL-FEC drops too may packets due to its incapacity to remove the excessive errors, the Application Function can ask the cellular network through the NEF (Network Exposure Function) to reduce the thresholds of the PHY-FEC Error Metrics and eventually to mention the modified thresholds of the PHY-FEC Error Metrics, as Residual Number of Failed Equations, of the Residual Failed Equations Rate and of the Cumulative Residual Failed Equations Rate.

RLC Sublayer Behavior

In an embodiment of this invention, the user data payload, which belongs to a QoS flow indicating an allowance for packets decoded with errors by the PHY layer, is not dropped as in prior art, but is instead transmitted by the PHY layer to the MAC sublayer, and from MAC to RLC, and from RLC to PDCP sublayer and so on until the UPF (User Plane Function).

In an embodiment of this invention, after the user data is retransmitted for the configured number of times in ACK Mode at the transmitter side, the RLC entity in the receiver Layer 2 chain will forward, to the PDCP sublayer, the user data PDU with errors.

PDCP Sublayer Behavior

3GPP defines data encryption for both User Plane and Control Plane communication with the UE, as part of PDCP sublayer functionality.

The stream ciphers used in 3GPP standards operate serially by creating a stream of pseudorandom key bits and a key stream. Stream ciphers do not suffer from the error propagation because each bit is separately encrypted/decrypted while using a XOR operator.

As result, n errored bits at PHY receiver will remain n errored bits at the UPF (gateway) input or at the UE egress point.

The Application Function (AF) can select the suitable PHY-FEC Error Metric and the corresponding threshold and transmit this information through its logical interface with the Network Exposure Function within the Core Network, over the N33 reference point, or through its interaction with the Policy Control Function (PCF) over the N5 reference point.

Core Network and UE Behavior for Transmitting Errored Packets

When erroneous bits are transferred to the upper layers by the PHY, MAC, RLC and PDCP sublayer, the UDP IP or TCP IP checksum will not match anymore and the entire packet will be discarded by AMF.

The user packet containing errors and arriving at cellular system egress point, i.e. UE or UPF in Core Network, will have a checksum or CRC which does not fit the actual content of the packet and will become a candidate for being discarded by the network.

In an embodiment of this invention, in case of Error Tolerance behavior for a PDU session or QoS flow at the egress point of UE or UPF in Core Network, the data packet containing the wrong checksum or CRC will be encapsulated and, if required by the used transport protocol, will include a checksum or CRC which fits the actual content of errors-containing packet.

In such a case the encapsulated data packet should be transmitted to a network address dedicated to errored packets.

This network address can be provided by the Application Function to the NEF and the Core Network will configure the UPF to replace the old destination address with the address provided by the NEF.

Measurements and Reports

As the user data is mapped to a specific PDU session, in an embodiment of this invention the AMF will report to SMF for a PDU session which allows Error Tolerance behavior, the number of user packets or the percentage/rate of user packets transmitted with errors in a given time interval or between start and stop signals and the number of total packets and/or discarded packets in the same intervals for the specific PDU session and/or QOS flow.

In an embodiment of this invention, the gNB uplink MAC sublayer will report to AMF, through the gNB and over N2/NR interface, the number of user packets or the percentage/rate of user packets transmitted with errors to the higher layers because the PHY-FEC Error Metric was lower than a threshold in a given time interval or between start and stop signals, and the number of total packets and/or the number or the rate of the discarded packets in the same intervals for the specific PDU session and/or QOS flow.

In case of a base station split into Central Unit (CU) and Distributed Unit (DU), the reports will be transmitted through the F1 interface between CU and DU.

In case of a Central Coordinator (similar with RIC—RAN Intelligent Controller, defined by O-RAN Forum), the reports will be also transmitted from the base station, or from the CU or from the DU to the Central Coordinator.

The UE will report to AMF, through the gNB over N1/NR/RRC interface, the number of errored user packets per PDU session and/or QoS flow, received from its PHY layer.

The UE messages will be transmitted using the RRC protocol.

The Network Analytics function can be used for determining, based on the gNB or UE above-detailed reports, the threshold of PHY-level RNSE or RNSER in cases that no AL-FEC is applied and/or in cases the AL-FEC is applied.

In order to allow for coordination between AL-FEC and PHY-FEC, the PHY-FEC measured performance will be reported from the PHY layer of the BS and/or of the UE to the higher layers of the BS and/or of the UE, and from here to the AMF over the already mentioned interfaces.

The AMF will relay the PHY-FEC measured performance to SMF and SMF will transmit the information to the AF.

The PHY-FEC measured performance is reflected in the measured PHY-FEC Error Metrics defined above including Residual Number of Failed Equations, Residual Failed Equations Rate, Cumulative_FEC_Total_Equations and Cumulative Residual Failed Equations Rate.

UE Block Diagram

Figure 4:
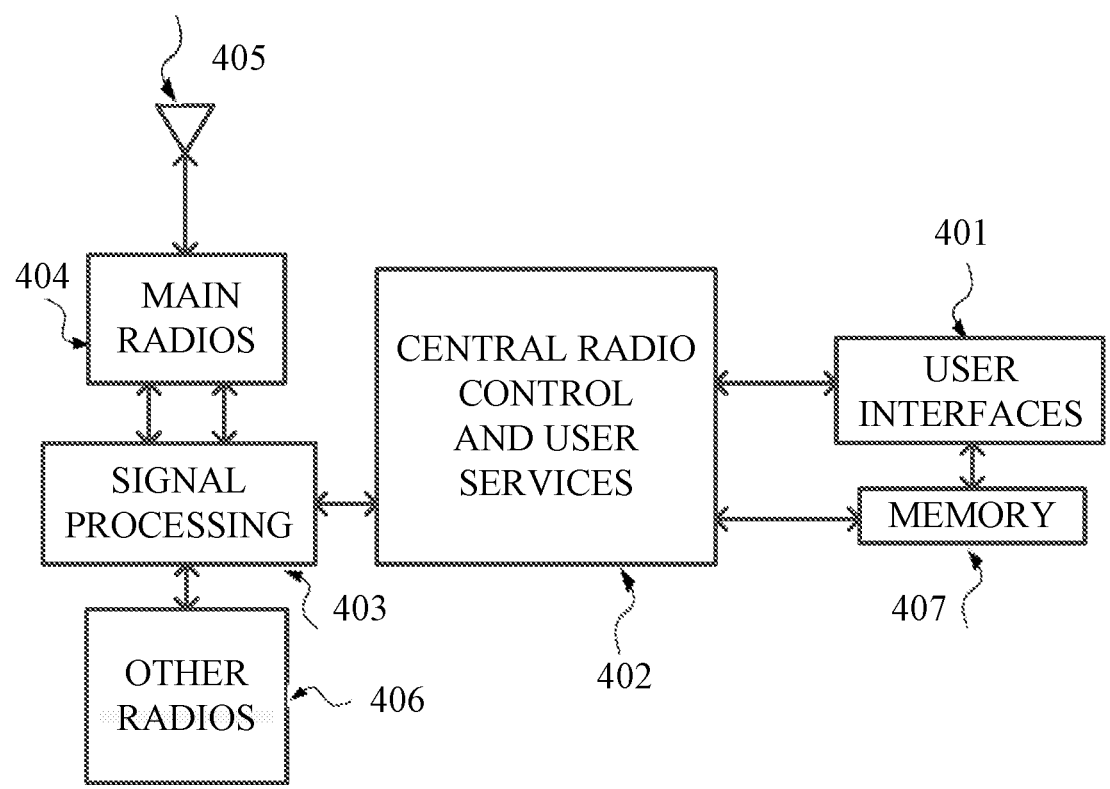
FIG. 4—Represents a Block Diagram of a UE (User Equipment).

FIG. 4 shows the UE block diagram. The central radio control, including the functions related to the User Plane and Control Plane as described in 3GPP TS 36.300 and radio activities, is located within a central processing unit 402, which may also perform other high-layer user services, including running user applications. In such a case, the computing resources of the central processing unit 402 may be allocated to different virtual machines, wherein each virtual machine can run its own operating system. In an embodiment, a dedicated processor is allocated for running user applications. The user application is in fact a computer software product, stored on a Server in Internet and/or comprising a non-transitory computer-readable medium on which program instructions are stored. The user application is downloaded to a non-volatile memory belonging to the memory block 407 of the UE.

The user interfaces, such as the display, speaker, microphone, industrial interfaces, industrial sensor interfaces are located in a user interface block 401.

A memory block 407, containing RAM and non-volatile memory (FLASH or ROM) is used by the central processing unit 402 and depending on the actual UE implementation, may be used also by the user interfaces 401.

Digital signal processing is performed by a signal processing block 403 and can give services to the radios using FDD or TDD for communication, like radios 404, for the cellular operation in licensed and un-licensed bands, and also to other radios—406, such as WiFi and Bluetooth, operating generally in license-exempt bands. Antennas 405 can be used for receive (RX) and transmit (TX), while using diplexers or switches to connect it. If the receive and transmit radio frequencies are far from each other, however, different antennas may be used.

Base Station or Distributed Unit Block Diagram

Figure 5:
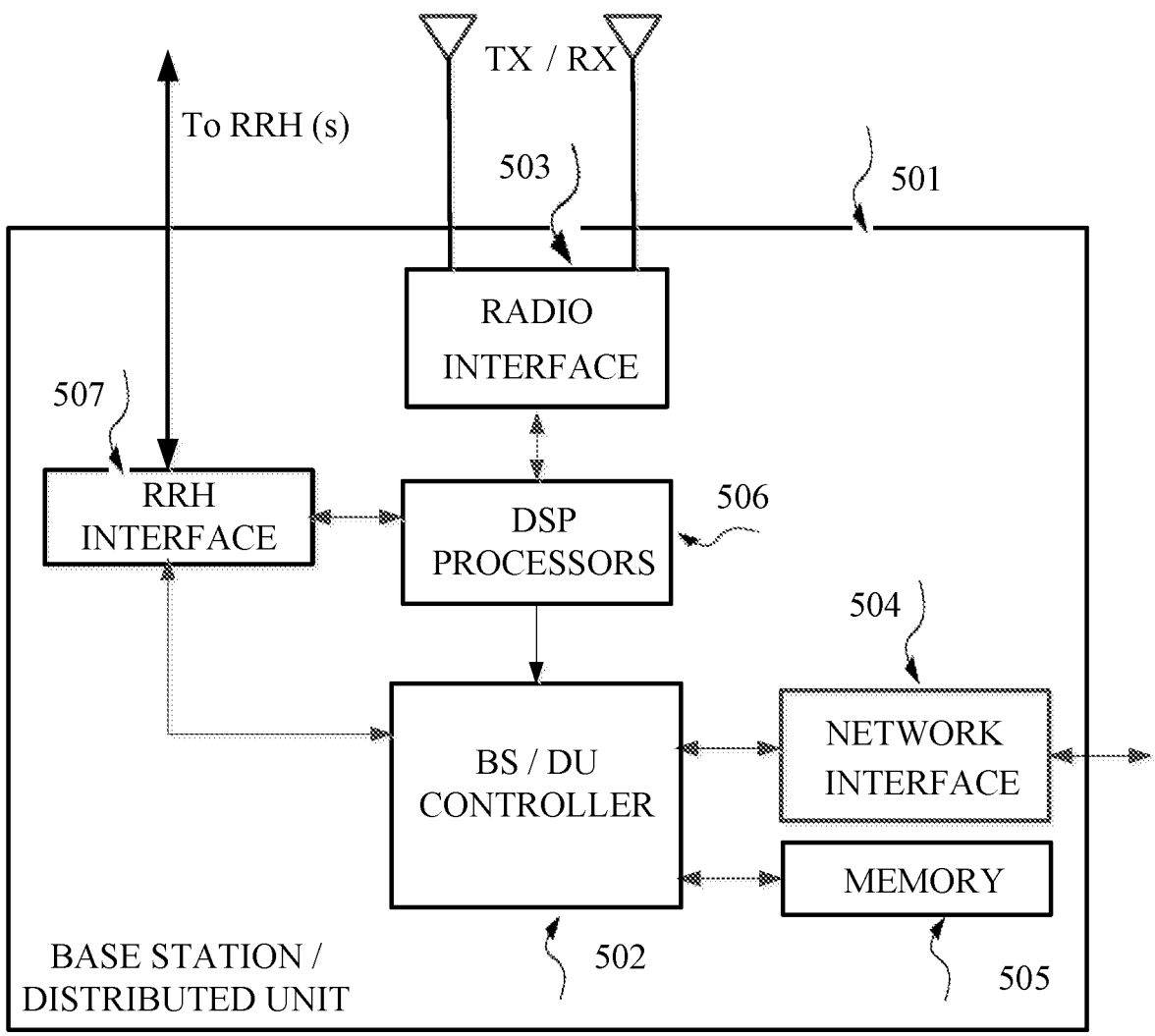
FIG. 5—Represents a Block Diagram of a base station or of a Distributed Unit (DU) of a base station.

The BS or DU blocks shown in FIG. 5 are only by way of example; in practical implementations these blocks can be distributed on multiple circuit boards, and the control functions and hardware functions can be implemented on commercial processors or tailor-made logical arrays, such as system-on-a-chip, FPGAs, ASICs.

The blocks of the BS or DU—501 include a controller—502, one or more DSP processors —506 connected to a radio interface—503, providing wireless communication over Uu interface with UEs and optionally may include an interface—507 to an RRH (Remote Radio Head) including a synchronization signal. The network (communication) interface—504 enables message transmission to Core Network, other RAN (Radio Access Network) units or to the OAM (Operations, Administration and Maintenance).

The controller—502 includes a common MAC sublayer for assigning PHY resources to the connection of one or more UEs while using a Uu or a Sidelink technology. A memory block—505, containing, for example, RAM and non-volatile memory (FLASH or ROM) is used by the central control unit—502. The data used by the controller—502 may be stored in the memory block—505.

Computing Platform

A computing platform 601 (see FIG. 6) is a system that consists of one or more processors 602, non-volatile memory 603, volatile memory 605, a network communication interface— 604 and a system controller 606. An application, program or process runs over an operating system installed in the computing platform.

The computing resources of a computing platform can be dynamically allocated to one or more partitions, for example containers or virtual machines, such that each container or virtual machine can use a number of processor cycles and a partition of the volatile and non-volatile memory. Each virtual machine can run its own operating system, such that multiple operating systems can coexist on the same computing platform.

Central Coordinator

The Central Coordinator includes one or more software modules, adapted for controlling the system nodes based on the received information.

The Central Coordinator defines, controls the system nodes and the UE and receive operational status information from virtualized or non-virtualized base stations and UEs.

The Central Coordinator includes hardware computing resources such as one or more processors, memory, communication interfaces.

Figure 6:
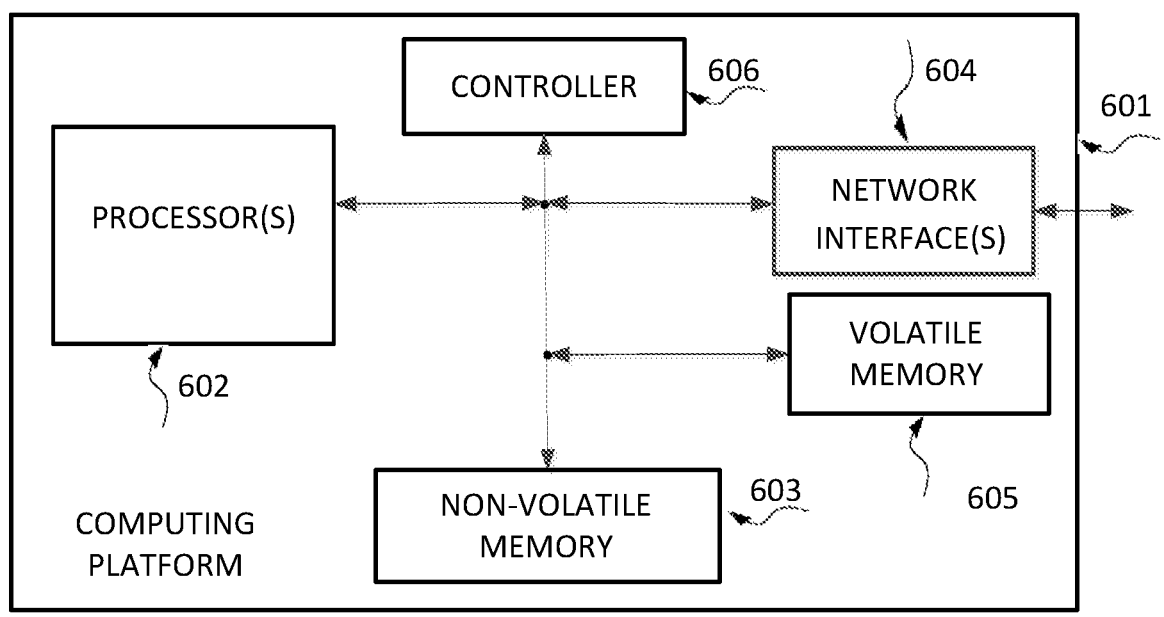
FIG. 6—Represents a Block Diagram of a computing platform.

The Central Coordinator may use dedicated enclosures or can run its software on a partition of computing resources belonging to a computing platform, as shown in FIG. 6.

Technologies

The description of this inventions uses terminology currently available for the 5G-NR technology. It shouldn't be considered that the invention is limited to this deployment mode, i.e. the sublayers included in an DU may be included in a virtualized base station or in a non-virtualized base station and the description is also pertinent to these deployment options.

The deployment can use the LTE technology, such that eNB corresponds to base station, Si interface corresponds to NR (New Radio) interface, MME (Mobility Management Entity) corresponds to AMF, S-GW (Service Gateway) corresponds to UPF.

As will be appreciated by those skilled in the art, the terminology used throughout the specification is mainly that which is associated with LTE and 5G standards. However, it should be understood that embodiments of the present invention encompass other wireless technologies as IEEE 802.11 technology and its associated stations and future generations of cellular technologies.

The configured or pre-configured (for example as requested by standards) PHY-FEC and the Error Metrics defined in this invention are also pertinent to LDPC FEC, used in IEEE 802.11 or in satellite communication, and to other FEC algorithms.

The examples provided show certain ways of carrying out the invention. It is to be understood that invention is not intended to be limited to the examples disclosed herein. Rather, the invention extends to all functionally equivalent structures, methods and uses, as are within the scope of the claims.

LIST OF ABBREVIATIONS

5GC 5G Core
5QI 5G QoS Identifier
5GS 5G System
ACK Acknowledge
AF Application Function
AI Artificial Intelligence
AL Application Layer
AM Acknowledged Mode
AMF Access and Mobility Management Function
ARQ Automatic Repeat Request
ASIC Application Specific Integrated Circuit
BS Base Station
BWP BandWidthPart
CE Control Element
CID Context ID
CN Core Network
CP Control Plane
CRC Cyclic Redundancy Check
CU Central Unit
CS Core System
CSI Channel State Information
D2D Device to Device
D/A Digital to Analog
DCI Downlink Control Information DL Downlink
DL-SCH Downlink Shared Channel
DMRS Demodulation Reference Signal
DRB Data Radio Bearer
DU Distributed Unit
E1 Interface between gNB-CU-CP and gNB-CU-UP
E6 Interface between SLH-CU-CP and SLH-CU-UP
EOC Ethernet Header Compression
eNB evolved Node B
F1-U F1 User plane interface
F1-C F1 Control plane interface
F1AP F1 Application Protocol
FDD Frequency Division Duplex
FEC Forward Error Correction
FFT Discrete Fourier Transform
FPGA Field Programmable Gate Array
FS Interface between SLH-CU and SLH-DU
gNB new generation Node B
GTP GPRS Tunneling Protocol
HARQ Hybrid Automatic Repeat Request
HMI Human Machine Interface
H-TB Headers TB
LDPC Low Density Parity Codes
IE Information Element
ID Identifier
I/O Input/Output
IP Internet Protocol
ISO International Organization for Standardization
LCID Logical Channel Identifier
LDPC Low Density Parity Codes
IE Long Term Evolution
MAC Medium Access Control
MCS Modulation and Coding Scheme
MIB Master Information Block
MEC Mobile Edge Computing
ML Machine Learning
MME Mobility Management Entity
NAS Non-Access Stratum
NEF Network Exposure Function
NR New Radio (aka 5G)
NWDAF Network Data Analytics Function
OAM Operation and Maintenance
PCF Policy Control Function
PDCCH Physical Downlink Control Channel
PDCP Packet Data Convergence Protocol
PDU Packet Data Unit
PER Packet Error Rate
PET PHY Error Tolerance
PET-RNTI PHY Error Tolerance-RNTI
PHY Physical, Physical Layer
PHY-FEC Physical Layer-FEC
PLC Programmable Logic Controller
PLMN Public Land Mobile Network
PRB Physical Resource Block
PSCCH Physical Sidelink Control Channel
PSFCH Physical Sidelink Feedback Channel
P-TB Payload TB
PUCCH Physical Uplink Control Channel
PUSCH Physical Uplink Shared Channel
QFI QoS Flow Identifier
QoS Quality of Service
RAN Radio Access Network
RF Radio Frequency
RFER Residual Failed Equations Rate
RLC Radio Link Control
RNFE Residual Number of Failed Equations
RNTI Radio Network Temporary Identifier
ROHC Robust Header Compression
RRC Radio Resource Control
RRH Remote Radio Head
RS Reference Signal
RSRP Reference Signal Received Power
RSRQ Reference Signal Received Quality
SCI Sidelink Control Information
SCS Sub-Carrier Spacing
SLH Side Link Unit
SD Slice Differentiator
SDAP Service Data Adaptation Protocol
SDU Service Data Unit
SIB System Information Block
SINR Signal to Interference and Noise Ratio
SL Sidelink
SMF Session Management Function
S-NSSAI Single Network Slice Selection Assistance Information
SPS Semi-Persistent Scheduling
SR Scheduling Request
SRS Sounding Reference Signal
SS Synchronization Signal
SSB SS/PBCH block
TB Transport Block
TCP Transmission Control Protocol
TM Transparent Mode
UCI Uplink Control Information
UDP User Datagram Protocol
UL Uplink
UM Un-acknowledged Mode
UP User Plane
UPF User Plane Function
URLLC Ultra-Reliable Low-Latency Communication
USIM Universal Subscriber Identity Module
V2X Vehicle to Everything
Xn-U Xn-User plane
XnAP Xn Application Protocol
Xns Interface between gNB and SLH

The invention claimed is:

1. A method for communication, comprising:
establishing a radio communication link between first and second nodes in a cellular network, the first and second nodes comprising at least channel coding and decoding by first and respective second Physical Layer (PHY) and first and respective second Medium Access Control (MAC) sublayer;
transmitting user data from the first node to the second node over the radio communication link while applying a PHY Forward Error Correction (FEC) algorithm in transmission, for coding of the user data, and in reception for decoding of the user data;
computing a value of at least one PHY-FEC error metric with respect to errors in the user data received by the second node that are uncorrected by the PHY FEC algorithm; and
transferring the received user data including the uncorrected errors from the second PHY layer to the second MAC sublayer, subject to the value of the at least one PHY-FEC error metric being less than a threshold used by an error tolerance procedure.

2. The method according to claim 1, wherein the at least one PHY-FEC Error Metric comprises a Residual Number of Failed Equations in parity checks.

3. The method according to claim 1, wherein the at least one PHY-FEC Error Metric comprises a Residual Failed Equations Rate in parity checks.

4. The method according to claim 1, wherein the at least one PHY-FEC Error Metric comprises a Cumulative Residual Failed Equations Rate in parity checks.

5. The method according to claim 1, wherein a specific user payload is transmitted in a Transport Block (TB) which is different from the TB within which is transmitted at least one header added to the specific user payload by the cellular network.

6. The method according to claim 5, wherein the TB includes the user payload and the at least one header added by the cellular network, and for the at least one header is calculated a checksum or a Cyclic Redundancy Check (CRC).

7. The method according to claim 1, wherein at least one of the first and second MAC sublayers allocates specific scheduling resources for transmissions or receptions of user data according to the PHY error tolerance procedure.

8. The method according to claim 1, wherein at least one of the first and second MAC sublayers uses one or more distinctive Logical Channel Identifiers (LCIDs) for transmissions or receptions of user data according to the PHY error tolerance procedure.

9. The method according to claim 1, wherein at least one of the first and second MAC sublayers uses one or more distinctive Radio Network Temporary Identifiers (RNTIs) dedicated for scrambling the CRC of a Downlink Control Information (DCI) or of a Sidelink Control Information (SCI) pertinent to the PHY error tolerance procedure.

10. The method according to claim 1, wherein it is used at least one bit within a DCI or SCI information or in its header or a specific Logical Channel Identifier (LCID) within the TB header to indicate that the TB scheduled within the specified resources contains one or more user packets subject to the PHY error tolerance procedure.

11. The method according to claim 1, wherein it is used a first MAC Control Element for activating or disabling the PHY error tolerance procedure for user payload.

12. The method according to claim 1, wherein it is used a second MAC Control Element for configuring or re-configuring the threshold of the at least one PHY-FEC Error Metric.

13. The method according to claim 1, wherein it is used a Radio Resource Control (RRC) message for determining whether a specific UE supports the error tolerance procedure.

14. The method according to claim 1, wherein it is used an RRC semi-persistent scheduling message, sent by a BS, indicating whether the scheduling assignment or the uplink grant is used for sending a downlink or respectively an uplink TB including user data to be delivered by the second PHY layer to the second MAC sublayer according to the error tolerance procedure.

15. The method according to claim 1, wherein it is used an RRC protocol for configuring the threshold of the at least one PHY-FEC error metric of a remote UE.

16. The method according to claim 1, wherein it is used the RRC protocol for transmitting the UE measurements related to at least one of: a number of errored user packets per PDU session and a number of errored user packets per Quality of Service (QOS) flow, received from its PHY layer.

17. A method according to claim 1, and comprising transferring the user data including the uncorrected errors through the second MAC sublayer to an application for processing.

18. A method according to claim 17, and comprising correcting the uncorrected errors in the user data by an application-specific FEC decoding algorithm.

19. A receiver in a cellular network, in which is established a radio communication link between first and second nodes, the first and second nodes comprising at least channel coding and decoding by first and respective second Physical Layer (PHY) and first and respective second Medium Access Control (MAC) sublayers and wherein is transmitted over the radio communication link user data from the first node to the second node comprising the receiver, while applying PHY Forward Error Correction (FEC) algorithms for coding of the user data in transmission and for decoding of the user data in reception, the receiver comprising:
a memory;
at least one of: a network interface and a user interface; and
at least one processor, which is configured to apply the decoding PHY FEC algorithm for correcting errors in received user data and to transfer the received user data including uncorrected errors to the second MAC sublayer, subject to the value of at least one PHY-FEC error metric being less than a threshold used by an error tolerance procedure.

20. The receiver according to claim 19, wherein the first node is a base station and the second node is a User Equipment (UE).

21. The receiver according to claim 19, wherein the first node is a first User Equipment (UE) and the second node is at least one of: a second User Equipment and a serving base station, or at least one of: a Central Unit (CU) of the serving base station and a Distributed Unit (DU) of the serving base station.

22. A computing platform comprising the receiver according to claim 19, wherein the at least one processor is located on the computing platform.

23. A computer software product, comprising or using a non-transitory computer-readable medium on which program instructions are stored, which instructions, when read by a first processor associated at application layer with a transmitting side, cause the first processor on transmitting side to apply to user data coding by an Application Layer Forward Error Correction (AL-FEC) algorithm, and when read by a second processor associated at application layer with receiving side connected by cellular radio communication to the transmitting side, cause the second processor to apply decoding of user data on receiving side, such that when the second processor receives user data at the application layer including errors uncorrected by receiving PHY layer, subject to the value of at least one PHY Layer Forward Error Correction (PHY-FEC) error metric being under a threshold, the AL-FEC decoder on the receiving side corrects the uncorrected errors within the received user data.

24. The computer software product according to claim 23, wherein the first processor is associated with an Application Server or a User Equipment and the second processor is respectively associated with an User Equipment or an Application Server.

* * * * *